US010457758B2

(12) United States Patent
Jayaratne et al.

(10) Patent No.: US 10,457,758 B2
(45) Date of Patent: Oct. 29, 2019

(54) SUPPORTED ZIEGLER NATTA PROCATALYST FOR ETHYLENE POLYMERISATION

(71) Applicant: Borealis AG, Vienna (AT)

(72) Inventors: Kumudini Jayaratne, Helsinki (FI); Elina Hamalainen, Helsinki (FI); Kalle Kallio, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/652,414

(22) PCT Filed: Dec. 20, 2013

(86) PCT No.: PCT/EP2013/077555
§ 371 (c)(1),
(2) Date: Jun. 15, 2015

(87) PCT Pub. No.: WO2014/096296
PCT Pub. Date: Jun. 26, 2014

(65) Prior Publication Data
US 2015/0315316 A1 Nov. 5, 2015

(30) Foreign Application Priority Data
Dec. 21, 2012 (EP) ..................... 12198801

(51) Int. Cl.
C08F 4/52 (2006.01)
C08F 4/68 (2006.01)
C08F 210/16 (2006.01)

(52) U.S. Cl.
CPC ................. C08F 210/16 (2013.01)

(58) Field of Classification Search
None
See application file for complete search history.

(56) References Cited

U.S. PATENT DOCUMENTS

| 4,392,983 | A | 7/1983 | Hartshorn et al. |
| 4,647,635 | A | 3/1987 | Hall |
| 5,055,535 | A | 10/1991 | Spitz et al. |
| 5,391,654 | A | 2/1995 | Ahvenainen et al. |
| 8,575,283 | B1 | 11/2013 | Fang et al. |
| 2004/0235645 | A1 | 11/2004 | Morini et al. |
| 2004/0242407 | A1 | 12/2004 | Denifl et al. |
| 2005/0176900 | A1 | 8/2005 | Zhu et al. |
| 2014/0058053 | A1* | 2/2014 | Fang ............... C08F 4/16 526/125.3 |
| 2014/0378298 | A1* | 12/2014 | Kipiani ............ C08F 10/06 502/107 |
| 2016/0060372 | A1 | 3/2016 | Saeed et al. |

FOREIGN PATENT DOCUMENTS

| CN | 1708518 | A | 12/2005 | |
| CN | 101351479 | A | 1/2009 | |
| CN | 102257019 | A | 11/2011 | |
| CN | 102388070 | A | 3/2012 | |
| CN | 104039841 | A | 9/2014 | |
| DE | 2030991 | A1 | 3/2009 | |
| EP | 0183538 | A2 | 11/1985 | |
| EP | 0273208 | * | 7/1988 | ............ C08F 10/00 |
| EP | 0273208 | A2 | 7/1988 | |
| EP | 0856013 | B1 | 7/2000 | |
| EP | 0713886 | B1 | 7/2001 | |
| EP | 1415999 | B1 | 10/2002 | |
| EP | 1489110 | B1 | 6/2003 | |
| EP | 1862480 | B1 | 5/2006 | |
| EP | 1862481 | B1 | 5/2006 | |
| EP | 1780225 | A1 | 5/2007 | |
| EP | 2415790 | B1 | 7/2010 | |
| EP | 2228395 | A1 | 9/2010 | |
| EP | 2246368 | A1 | 11/2010 | |
| EP | 2610273 | A1 | 12/2011 | |
| EP | 2495266 | A1 | 9/2012 | |
| EP | 2610273 | A1 | 7/2013 | |
| WO | 9212182 | A1 | 7/1992 | |
| WO | 9618662 | A1 | 6/1996 | |
| WO | 9714723 | A1 | 4/1997 | |
| WO | 0008073 | A1 | 2/2000 | |
| WO | 0008074 | A1 | 2/2000 | |
| WO | 0026258 | A1 | 5/2000 | |
| WO | 0058374 | A1 | 10/2000 | |
| WO | 0155230 | A1 | 8/2001 | |
| WO | 03000754 | A1 | 1/2003 | |
| WO | 03000757 | A1 | 1/2003 | |
| WO | 2004029112 | A1 | 4/2004 | |
| WO | 2011087841 | A1 | 7/2011 | |
| WO | 2011157742 | A1 | 12/2011 | |
| WO | WO 2013098139 | * | 7/2013 | ............ C08F 10/06 |

OTHER PUBLICATIONS

Office action for the Chinese Application No. 201380066705.7 dated Feb. 3, 2016.
Chinese Office Action dated Dec. 3, 2015.
U.S. Appl. No. 14/649,472, Office Action dated Jul. 14, 2016.
U.S. Appl. No. 14/649,472, Office Action dated Nov. 14, 2016.
Search Report for Patent Application No. UAE/P/0799/2015.
Examination Report for Patent Application No. UAE/P/0799/2015.
Partial acceptance of patent application No. (799), dated Aug. 22, 2019.

* cited by examiner

Primary Examiner — Yun Qian
(74) Attorney, Agent, or Firm — Tarolli, Sundheim, Covell & Tummino

(57) ABSTRACT

Supported Ziegler-Natta ethylene polymerization procatalyst comprising special bi-(oxygen containing ring) compounds as internal donor, as well as a process for preparing the same and use of such a procatalyst for preparing a catalyst system used in the polymerization of ethylene for producing high molecular weight polyethylenes.

12 Claims, No Drawings

SUPPORTED ZIEGLER NATTA PROCATALYST FOR ETHYLENE POLYMERISATION

This invention relates to a supported Ziegler Natta ethylene polymerisation procatalyst, particularly one comprising a special electron donor as well as a process for preparing the same. The invention also relates to the use of such a procatalyst for producing ethylene polymers with high molecular weight. The resulting polymers per se form another aspect of the invention.

BACKGROUND OF THE INVENTION

Ethylene, alone or with other olefinic unsaturated monomers are frequently polymerised in the presence of catalyst compositions, which have essentially two components: a compound of a transition metal belonging to any of groups 4 to 6 of the Periodic Table of Elements (IUPAC 2007) which is often called a procatalyst, and a compound of a metal belonging to groups 1, 2 or 13 of said Table which is the s.c. cocatalyst. This kind of Ziegler-Natta catalyst composition has been further developed by depositing the procatalyst on a less or more inert and particulate support and by adding to the catalyst composition in the stages of its preparation several additives, among others electron donating compounds.

The catalyst composition used for the production of the ethylene (co-)polymers determines i.a. the properties of the polymers. Thus, the catalyst composition allows for a "tailoring" of the properties of the produced resins.

For tailoring the properties of the produced ethylene polymers it was already suggested to use ZN-catalysts comprising an internal donor, like THF (tetrahydrofuran).

For example WO 00/58374 discloses ZN catalysts comprising THF, whereby the primary purpose of the THF is to reduce the level of electrostatic charge in the polymerisation medium so that agglomeration of polymer particles does not occur.

U.S. Pat. No. 5,055,535 discloses a method for controlling the MWD of polyethylene homopolymers and copolymers using a ZN catalyst comprising an electron donor selected from monoethers (e.g. tetrahydrofuran). The monoether, like tetrahydrofuran is added to the catalytic component and the cocatalyst, at the latest, upon commencement of the polymerisation reaction and that under no circumstance should the monoethers be brought into contact with the catalytic component without the presence of the cocatalyst in the medium.

EP 1780225 A1 suggest the possibility of tailoring the properties of a multimodal ethylene polymer by using a modified ZN catalyst to influence the molecular weight distribution (MWD) of a higher molecular weight (HMW) component whilst essentially having no affect on the MWD of the lower molecular weight (LMW) component. The electron donor present in the ZN catalysts used is preferably tetrahydrofuran, whereby the ZN catalyst is preferably preformed and then contacted with an electron donor and optionally dried.

Nevertheless, although much development work has been done in the field of Ziegler-Natta catalysts for producing polyethylene, there are still some problems to be solved.

One problem that is often encountered with prior art Ziegler-Natta-catalysts is that it is difficult to produce an ethylene homo- or copolymer having high molecular weight. Polyethylenes of high molecular weight show i.a. an enhanced toughness. However, as the molecular weight of the polyethylene increases, the processability of the resin usually decreases.

Further nowadays HSE-(health, safety & environment) policies are an important factor in the production of catalysts and further polymers. In other words the polymers must fulfill the strict health and environmental requirements national and international institutions. One class of substances which have been considered as potential harmful compounds is phthalates, which have been commonly used as internal electron donors in Ziegler-Natta type catalysts. Also tetrahydrofuran has been recognized as a hazardous substance.

For these reasons it is still desirable to find alternative internal donors which do not include phthalates and/or tetrahydrofuran and which yields desired polymer properties, namely high molecular weight.

Thus, it was an objective of the present invention to provide a Ziegler-Natta procatalyst and its manufacture, which is environmentally sustainable and supports the preparation of ethylene polymers with high molecular weight.

Surprisingly these objects could be solved by the use of a supported Ziegler-Natta procatalyst with a special bi-(oxygen containing ring) compound as internal donor, which is added during the catalyst preparation.

Such bi-(oxygen containing ring) compounds have the formula (I)

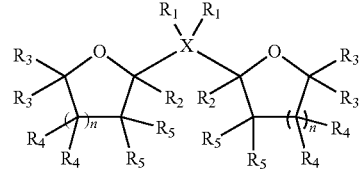

wherein in the formula (I)

X is C or Si, $R_1$ can be the same or different and can be hydrogen, a linear or branched $C_1$ to $C_8$-alkyl group, or a $C_3$-$C_8$-alkylene group, and $R_2$ to $R_5$ are the same or different and can be hydrogen, a linear or branched $C_1$ to $C_8$-alkyl, or a $C_3$-$C_8$-alkylene group, whereby two or more of $R_1$ to $R_5$ can form a ring, n is the same for both oxygen-containing rings and can be 0, 1 or 2, whereby the two oxygen-containing rings can be individually saturated or unsaturated.

Such compounds are known for example from EP 2495266 A1, WO-2011/157742 or WO 2011/087841 as randomizer/polar agent/modifier in the preparation of high styrene high vinyl solution-based styrene-butadiene rubber or from EP 183538 A1 as a reactive diluent in epoxy resins.

DESCRIPTION OF THE INVENTION

Accordingly the present invention provides a supported Ziegler-Natta procatalyst for ethylene polymerisation as defined in claim 1.

Accordingly the present invention further provides a process for preparing a supported Ziegler-Natta ethylene polymerisation procatalyst as defined in claim 1.

Thus the present invention provides a supported Ziegler-Natta procatalyst for ethylene polymerisation, which procatalyst comprises a) a Group 1 to 3 metal, preferably a Group 2 metal, more preferably Mg content (determined by ICP Analysis) in the range of 5.0 to 22.0 wt %, preferably 6.0 to 20 wt %, more preferably 6.5 to 18 wt % b) a Group 13 or 14 metal, preferably a Group 13 metal, more preferably an Al content (determined by ICP Analysis) in the range of 0.1 to 5.0 wt %, preferably 0.2 to 4.0 wt %, more preferably 0.3 to 3.5 wt % c) and an internal donor selected from bi-(oxygen containing ring) compounds of formula (I)

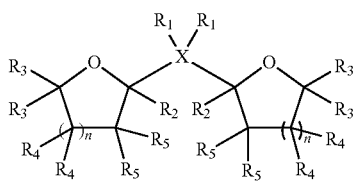

X is C or Si, $R_1$ can be the same or different and can be hydrogen, a linear or branched $C_1$ to $C_8$-alkyl group, or a $C_3$-$C_8$-alkylene group, and $R_2$ to $R_5$ are the same or different and can be hydrogen, a linear or branched $C_1$ to $C_8$-alkyl, or a $C_3$-$C_8$-alkylene group, whereby two or more of $R_1$ to $R_5$ can form a ring, n is the same for both oxygen-containing rings and can be 0, 1 or 2, whereby the two oxygen-containing rings can be individually saturated or unsaturated, or an isomer mixture therefrom, d) a Group 4 to 6 metal, preferably a Group 4 metal, more preferably Ti content (determined by ICP Analysis) in the range of 1.0 to 10.0 wt %, preferably 1.5 to 8.5 wt %, more preferably 2.0 to 7.0 wt %

As used herein the term "Ziegler Natta (ZN) procatalyst" is intended to cover a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), a compound of Group 13 or 14 of the Periodic Table (IUPAC) and an internal donor.

The metal compounds of Group 1 to 3 are selected from the group comprising, preferably consisting of metal dialkyls and alkyl metal alkoxides. It can further be selected from the group consisting of dialkyloxy metal, diaryloxy metal, alkyloxy metal halides, aryloxy metal halides, alkyl metal alkoxides, aryl metal alkoxides and alkyl Group aryloxides.

Preferably the metal compound of Group 1 to 3 is preferably a Group 2 metal compound and more preferably a magnesium compound.

Most preferably the magnesium compound is the reaction product of a magnesium dialkyl $(R^6)_2Mg$ and an alcohol $R^7OH$.

The magnesium dialkyl compound has formula $(R^6)_2Mg$, wherein the two $R^6$ are the same or different and can be a linear or branched or cyclic $C_1$-$C_{20}$-alkyl or $C_5$-$C_{10}$-aryl group.

Suitably the $C_1$-$C_{20}$-alkyl group and the $C_5$-$C_{12}$-aryl group can be an alkyl, cycloalkyl, alkylcycloalkyl, cycloalkylalkyl, aryl, arylalkyl, or alkylaryl, wherein "alkyl" used as alone or as part of another option can be linear or branched and "aryl" is of 5-12 carbon ring atoms, suitably phenyl or naphthyl.

Preferably the two $R^6$ can be independently a linear or branched $C_2$-$C_{10}$-alkyl.

Typical magnesium alkyls are ethyl butyl magnesium, dibutyl magnesium, dipropyl magnesium, propyl butyl magnesium, dipentyl magnesium, butyl pentyl magnesium, butyl octyl magnesium and dioctyl magnesium. Most preferably, one $R^6$ is a butyl group and the other $R^6$ is an ethyl or octyl group, i.e. the dialkyl magnesium compound is butyl octyl magnesium or ethyl butyl magnesium.

The alcohol has the formula $R^7OH$ with $R^7$ being a linear or branched or cyclic $C_1$-$C_{20}$-alkyl group or $C_5$-$C_{10}$-aryl group.

Suitably the $C_1$-$C_{20}$-alkyl group and the $C_5$-$C_{12}$-aryl group can be an alkyl, cycloalkyl, alkylcycloalkyl, cycloalkylalkyl, aryl, arylalkyl, or alkylaryl, wherein "alkyl" used as alone or as part of another option can be linear or branched and "aryl" is of 5-12 carbon ring atoms, suitably phenyl or naphthyl.

Typical $C_1$-$C_5$ alcohols are methanol, ethanol, n-propanol, iso-propanol, n-butanol, iso-butanol, sec.-butanol, tert.-butanol, n-amyl alcohol, iso-amyl alcohol, sec. amyl alcohol, tert.-amyl alcohol, diethyl carbinol, sec. isoamyl alcohol, tert. butyl carbinol, cyclopentanol.

Typical $C_6$-$C_{10}$ alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol. Typical $>C_{10}$ alcohols are n-1-undecanol, n-1-dodecanol, n-1-tridecanol, n-1-tetradecanol, n-1-pentadecanol, 1-hexadecanol, n-1-heptadecanol and n-1 octadecanol.

The alcohols may be unsaturated, as long as they do not act as catalyst poisons.

Preferable alcohols are those of formula $R^7OH$ in which $R^7$ is a linear or branched $C_2$-$C_{16}$ alkyl group, most preferably a linear or branched $C_4$-$C_{12}$ alkyl group, particularly 2-ethyl-1-hexanol.

The reaction product of the magnesium dialkyl $(R^6)_2Mg$ and an alcohol $R^7OH$ has the formula $Mg(OR^7)_{2-n}(R^6)_n$ (II).

In the formula (II) $R^6$ and $R^7$ are defined as described above and can be independently a $C_1$-$C_{20}$ alkyl group or a $C_5$-$C_{12}$-aryl group, the alkyl or aryl group may optionally be substituted with halogen.

Furthermore in formula (II) $0 \le n < 2$.

Said magnesium compound of formula (II) may be commercially available or, preferably, can be prepared by reaction of a magnesium dialkyl compound of the formula $R^6Mg$, as described above with the alcohol $R^7OH$, as defined above.

The magnesium dialkyl/alcohol molar ratio is from 1:1 to 1:4, preferably from 1:1.5 to 1:3.5, more preferably from 1:1.7 to 1:2.0.

The reaction of the magnesium dialkyl and the alcohol may take place at any temperature but preferably takes place at a low temperature, e.g. 0-40° C., especially at room temperature.

Preferably the compound of Group 13 or 14 is a Group 13 compound, more preferably an aluminium compound or a boron compound and most preferably an aluminium compound. Particularly preferably the aluminium compound is an aluminium compound of the formula $Al(alkyl)_xX_{3-x}$ (III), wherein alkyl is an alkyl group of 1 to 12 C-atoms, preferably 1 to 8 C-atoms, more preferably 1 to 6 C-atoms, X is halogen, preferably chlorine and 0≤x≤3, preferably x is 1 or 2. The alkyl group can be linear, branched or cyclic, or a mixture of such groups.

Suitable aluminium compounds are dialkyl aluminium chlorides or alkyl aluminium dichlorides or trialkyl aluminium compounds, for example dimethyl aluminium chloride, diethyl aluminium chloride, diisobutyl aluminium chloride, ethyl aluminium dichloride, methyl aluminium dichloride and triethylaluminium or mixtures therefrom.

Preferably used as aluminium compound are alkyl aluminium dichlorides, more preferably ethyl aluminium dichloride (EADC).

The transition metal compound of Group 4 to 6 is preferably a Group 4 transition metal compound and more preferably a titanium compound. Particularly preferably the titanium compound is a halogen-containing titanium compound of the formula $X_y Ti(OR^8)_{4-y}$ (IV), wherein $R^8$ is a $C_{1-20}$ alkyl, preferably a $C_{2-10}$ and more preferably a $C_{2-8}$ alkyl group, X is halogen, preferably chlorine and y is 1, 2, 3 or 4, preferably 3 or 4 and more preferably 4. Suitable titanium compounds include trialkoxy titanium monochlorides, dialkoxy titanium dichloride, alkoxy titanium trichloride and titanium tetrachloride. Preferably titanium tetrachloride is used.

The internal donor is selected from bi-(oxygen containing ring) compounds of formula (I) or isomer mixtures therefrom:

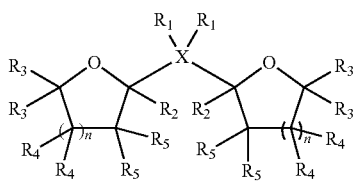

In the formula (I) X is C or Si,
$R_1$ can be the same or different and can be hydrogen, a linear or branched $C_1$ to $C_8$-alkyl group, or a $C_3$-$C_8$-alkylene group,
and $R_2$ to $R_5$ are the same or different and can be hydrogen, a linear or branched $C_1$ to $C_8$-alkyl, or a $C_3$-$C_8$-alkylene group,
whereby two or more of $R_1$ to $R_5$ can form a ring,
n is the same for both oxygen-containing rings and can be 0, 1 or 2,
whereby the two oxygen-containing rings can be individually saturated or unsaturated.

Examples for linear or branched $C_1$ to $C_8$-alkyl groups are methyl, ethyl, n-propyl, i-propyl, n-butyl, sec.-butyl, tert.-butyl, pentyls, hexyl, and the like.

Examples for $C_3$-$C_8$-alkylene groups are pentylene, butylenes and the like.

In the formula (I) X is preferably C.

Two or more of $R_1$ to $R_5$ can also form a ring. If one or more rings are formed by the residues $R_1$ to $R_5$, these are preferably formed by $R_3$ and $R_4$ and/or $R_4$ and $R_5$.

Preferably the residues $R_1$ to $R_5$ do not form rings.

The two $R_1$ are preferably the same and can be a linear $C_1$ to $C_4$-alkyl, more preferably methyl or ethyl and most preferably both $R_1$ are methyl.

$R_2$ to $R_5$ are preferably the same or different and can be H or a $C_1$ to $C_2$-alkyl, more preferably only up to four of the residues $R_2$ to $R_5$ are a methyl, the others are H and most preferably $R_2$ to $R_5$ are all H.

For both oxygen-containing rings n is the same and is 0, 1 or 2, preferably 1 or 2 and more preferably 1.

Furthermore both oxygen-containing rings are preferably saturated or unsaturated, more preferably both oxygen-containing rings are saturated.

Examples for saturated oxygen-containing rings are:

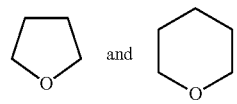 [SMILES: C1CCOC1 ; C1CCOCC1]

Examples for unsaturated oxygen-containing rings are:

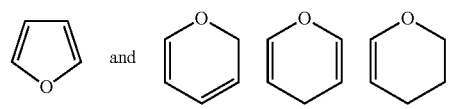

Examples of suitable internal donors are 2,2-di(2-tetrahydrofuryl)propane, 2,2-di(2-tetrahydropyranyl)propane, 2,2-di(2-(3,4-dihydro-2H-pyranyl))propane, 2,2-di-(2-pyranyl)propane, 2,2-di-(2-furan)-propane, as well as their analogous alkane compounds, like butane, hexane e.t.c.

The ZN procatalysts of the invention are supported.

According to the present invention there are two possible kinds of support.

First of all the support can be a conventional inorganic oxide (e.g. silica, alumina, titania, silica-alumina and silica-titania) or magnesium chloride.

Secondly the support is a special $MgCl_2$-carrier consisting of $MgCl_2$/Et-Al—(O—R)$_2$, which is formed in-situ as described in WO2004/055068.

ZN procatalysts supported on an inorganic oxide may be prepared by any conventional method known in the art.

In principle such a procatalyst is prepared by depositing
a) a metal compound of Group 1 to 3, preferably a metal compound of Group 2 and more preferably a magnesium compound of formula $Mg(OR^7)_{2-n}(R^6)_n$ (II), wherein each $R^7$ and $R^6$ is independently a $C_{1-20}$ alkyl group which may optionally be substituted with halogen and 0≤n<2
b) a metal compound of Group 13 or 14, preferably a metal compound of Group 13 and more preferably an Al compound having the formula $Al(alkyl)_x X_{3-x}$ (III), where alkyl is an alkyl group with 1 to 12, X is halogen and 0≤x≤3,
c) an internal donor selected from bi-(oxygen containing ring) compounds of formula (I)

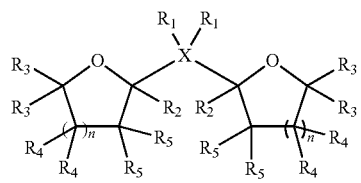

X is C or Si,
$R_1$ can be the same or different and can be hydrogen, a linear or branched $C_1$ to $C_8$-alkyl group, or a $C_3$-$C_8$-alkylene group,
and $R_2$ to $R_5$ are the same or different and can be hydrogen, a linear or branched $C_1$ to $C_8$-alkyl, or a $C_3$-$C_8$-alkylene group, whereby two or more of $R_1$ to $R_5$ can form a ring,
n is the same for both oxygen-containing rings and can be 0, 1 or 2,
whereby the two oxygen-containing rings can be individually saturated or unsaturated,
or an isomer mixture therefrom, and
d) a transition metal compound of Group 4 to 6, preferably a transition metal compound of Group 4 and more preferably a halogen-containing titanium compound of the formula $X_y Ti(OR^8)_{4-y}$ (IV), wherein $R^8$ is a $C_2$-$C_{20}$ alkyl group, X is halogen and y is 1, 2, 3 or 4
on a particulate inorganic support.

There are several possible ways for depositing the catalyst components (a) to (d) on a suitable inorganic catalyst support, i.e. by sequentially contacting the support with the above mentioned compounds, as described in EP 0 688 794, EP 0 835 887, WO 99/51646 or WO 00/44795, or by first preparing a solution from the all components and then contacting the solution with a support, as described in WO 01/55230, or first contacting compounds (a) and (b) in solution, whereupon the resulting solution is impregnated to on the support and subsequently impregnating compounds (c) and (d) to the support, as also described in WO 01/55230, all of which are herein fully incorporated by reference.

Variant I, according to EP 0 688 794 EP 0 835 887, WO 99/51646 or WO 00/44795, comprises the following steps:
the inorganic support is contacted with the metal compound of Group 13 or 14, preferably the metal compound of Group 13 and more preferably the alkyl aluminium halogen of formula (III) to give a first reaction product,
the first reaction product is contacted with the metal compound of Group 1 to 3, preferably the metal compound of Group 2 and more preferably with the magnesium compound of formula (II) to give a second reaction product,
the second reaction product is contacted with the transition metal compound of Group 4 to 6, preferably the transition metal compound of Group 4 and more preferably the titanium compound of formula (IV) to give said procatalyst.

Preferably the metal compound of Group 1 to 3, more preferably the metal compound of Group 2 and even more preferably the magnesium compound of formula (II) is first contacted with the internal donor of formula (I) or an isomer mixture therefrom to give an intermediate product and then the first reaction product is contacted with this intermediate product to give a second reaction product, which is then further contacted with the transition metal compound of Group 4 to 6, preferably the transition metal compound of Group 4 and more preferably the titanium compound of formula (IV).

The metal compound of Group 1 to 3, the preferred metal compound of Group 2 and the more preferred magnesium compound of formula (II), the metal compound of Group 13 or 14, the preferred metal compound of Group 13 and the more preferred aluminium compound of formula (III), the transition metal compound of Group 4 to 6, the preferred transition metal compound of Group 4 and the more preferred titanium compound of formula (IV) and the internal donor of formula (I) have been described and defined above.

In a further embodiment of Variant (I) it is preferred to form first a solid intermediate by contacting the compounds (a) and (b) and the inorganic support. It is appreciated that the inorganic support, compound (a) and compound (b) can be contacted in any order. Then, the resulting intermediate product containing the compounds (a) and (b) on the inorganic support is contacted with compound (d). This product is then further contacted with the electron donor compound (c) or an isomer mixture therefrom to produce the procatalyst.

Another preferred method is to form the intermediate product containing the compounds (a) and (b) and the inorganic support as before, and then contact this intermediate with the electron donor compound (c) or an isomer mixture therefrom. This contact product is then further contacted with the compound (d) to produce the procatalyst.

The obtained procatalyst may be washed after any state of the synthesis, using methods known in the art, such as filtering or decanting. Thus, a wash stage may be performed after the treatment with the electron donor compound (c), after the titanation treatment and/or as a last step of the synthesis. Inert hydrocarbons, such as pentane, hexane or heptane, may be used as wash liquids.

Variant II, according to WO 01/55230, comprises the following steps:
reacting the metal compound of Group 1 to 3, preferably the metal compound of Group 2 and more preferably the magnesium compound of formula (II) with the metal compound of Group 13 or 14, preferably the metal compound of Group 13 and more preferably the alkyl aluminium halogen of formula (III) in a non polar hydrocarbon solvent in which said metal compound of Group 1 to 3, preferably the metal compound of Group 2 and more preferably the magnesium compound is soluble to produce a solution (A)
contacting the solution (A) with the transition metal compound of Group 4 to 6, preferably the transition metal compound of Group 4 and more preferably the titanium compound of formula (IV) to produce a solution (B) and
contacting solution (B) with the inorganic support to give said procatalyst.

Preferably the metal compound of Group 1 to 3, more preferably the metal compound of Group 2 and even more preferably the magnesium compound of formula (II) is first contacted with the internal donor of formula (I) or an isomer mixture therefrom to give an intermediate product and then said intermediate product is reacted with the metal compound of Group 13 or 14, preferably the metal compound of Group 13 and more preferably the alkyl aluminium halogen of formula (III) as described above.

In a further embodiment it is also possible to add the internal donor of formula (I) or an isomer mixture therefrom into solution (B), before contacting solution (B) with the inorganic support.

The metal compound of Group 1 to 3, the preferred metal compound of Group 2 and the more preferred magnesium compound of formula (II), the metal compound of Group 13 or 14, the preferred metal compound of Group 13 and the more preferred aluminium compound of formula (III), the transition metal compound of Group 4 to 6, the preferred transition metal compound of Group 4 and the more preferred titanium compound of formula (IV) and the internal donor of formula (I) have been described and defined above.

Variant III, according to WO 01/55230, comprises the following steps:
first contacting compounds (a) and (b) in solution,
whereupon the resulting solution is impregnated onto the support and
subsequently impregnating compounds (c) and (d) to the support.

Suitable non polar solvents for Variant (II) and (III) are low-boiling compound containing from five to eight carbon atoms, which easily can be removed from the solid catalyst component. Such compounds are, among others, pentanes, hexanes, heptanes, octanes, cyclopentanes, cyclohexanes, cycloheptanes and some aromatic compounds, such as toluene. Especially preferred solvents are n-pentane or n-hexane or n-heptane. For example, the solvent is n-heptane.

In each preparation method, as described above, the components (a), (b) and (d) may be added in molar ratios known in the art and can be thus varied and optimized in a wide range in order to obtain the best results possible. However, the following amounts are preferred.

Preferably in the final solid procatalyst, the molar ratio of Mg:Ti can be e.g. between 10:1 to 1:10, preferably 5:1 to 1:1. The molar ratio of Ti:Al can be e.g. between 10:1 to 1:2, e.g. 3:1 to 1:1.

The molar ratio of internal donor to Ti is preferably from 0.005 to 10.0 and more preferably from 0.01 to 10.0 and even more preferably from 0.05 to 5.0

The inorganic support can be, as mentioned above, a conventional inorganic oxide (e.g. silica, alumina, titania, silica-alumina and silica-titania) or magnesium chloride and is preferably an inorganic oxide support, such as silica, alumina, titania, silica-alumina and silica-titania. More preferably, the inorganic oxide support is silica.

The support material preferably has a suitable average particle size and particle size distribution, porosity and specific surface area. Especially good results are obtained if the support material has a specific surface area of between 10 and 1000 $m^2/g$ support and a pore volume of 0.1-10 ml/g support. The support material can optionally be chemically pre-treated, e. g. by silylation or by treatment with aluminium alkyls.

The surface area, pore volume and particle size of the silica can be chosen according to the requirements of the specific polymerisation process, in which the catalysts will be used. Typically, silica particles having a surface area in the range of from about 10 to about 700 m2/g (BET method), pore volume in the range of from about 0.1 to about 6.0 cm3/g and average particle size in the range of from about 10 to about 100 µm can be used.

It is further preferred that the support material is calcinated, i.e. heat treated under air and then with a non-reactive gas such as nitrogen. This treatment is preferably done at a temperature in excess of 100° C., more preferably 200° C. or higher, e.g. 200-900° C., particularly about 600° C. The calcination treatment is preferably effected for several hours, e.g. 2 to 30 hours, more preferably about 10 hours.

Examples of suitable support materials, which are commercially available, are, for instance, ES747JR, produced and marketed by Ineos Silicas (former Crossfield), and SP9-491, Sylopol 55SJ, produced and marketed by Grace, etc.

Further preferred procatalysts of the present invention comprise a special $MgCl_2$-carrier consisting of $MgCl_2$/Et-Al—(O—R)$_2$ as described in WO2004/055068.

In this case the solid procatalyst of the present invention is prepared by contacting
[A] a solid magnesium aluminium complex containing magnesium, halogen, aluminium and an internal donor with
[B] a titanium compound First the solid magnesium aluminium complex (=catalyst support) containing magnesium, halogen, aluminium and an internal donor is described below:

Said complex can be obtained analogous as described in WO 2004/055068 by
(a1)) adding to a solution of a magnesium compound of the formula (II):

$Mg(OR^7)_{2-n}(R^6)_n$, wherein each $R^6$ and $R^7$ independently represents a $C_1$-$C_{20}$ alkyl group and 0≤n<2,
an internal donor of formula (I) or an isomer mixture therefrom and
(a2) contacting the solution of (a1)) with a solution of a compound of formula (III):
$Al(alkyl)_xX_{3-x}$, wherein each alkyl independently represents an alkyl of 1 to 6 carbon atoms; X is independently a halogen; 0≤x<3,
(a3) separating the solidified reaction product from the reaction mixture and optionally washing the product with a wash solution once up to 4 times, preferably up to three times.

A further possibility to obtain the complex is
(b1) adding to a solution of a magnesium compound of the formula (II):
$Mg(OR^7)_{2-n}(R^6)_n$, wherein each $R^6$ and $R^7$ independently represents a $C_1$-$C_{20}$ alkyl group and 0≤n<2,
a solution of a compound of formula (III):
$Al(alkyl)_xX_{3-x}$, wherein each alkyl independently represents an alkyl of 1 to 6 carbon atoms; X is independently a halogen; 0≤x<3,
(b2) separating the solidified reaction product from the reaction mixture and optionally washing the product with a wash solution once up to 4 times, preferably up to three times, whereby the internal donor is either first premixed with the solution of the compound of formula (III) or added after contacting the solution of a magnesium compound of the formula (II) with the solution of a compound of formula (III).

Accordingly, the catalyst support prepared according to this method comprises a reaction product formed at least from:
1) Compound (1): A magnesium compound of the formula (II):

$Mg(OR^7)_{2-n}(R^6)_n$, wherein $R^6$ and $R^7$ are defined as described above and 0≤n<2.

In a preferred embodiment of the invention, a magnesium compound of formula $Mg(OR^7)_{2-n}(R^6)_n$ (II), wherein $R^6$ and $R^7$ are defined as described above; is used, which may be commercially available or, preferably, is a reaction mixture of a magnesium alkyl compound of formula $Mg(R^6)2$ wherein each $R^6$ is defined as described above, with an alcohol $R^7OH$, wherein $R^7$ is defined as described above;
2) Compound (2) the internal donor of formula (I) as defined above
and
3) Compound (3): A halogen-containing auminium compound of formula (III):

$Al(alkyl)_xX_{3-x}$, wherein alkyl and X are defined as described above and 0≤x<3.

The internal donor of formula (I) is preferably added to a solution of compound (1), i.e. the magnesium compound of formula (II).

The so obtained solution is then added to a solution of compound (3) to cause the solidification (precipitation) of the solid reaction product.

A slowly addition under mixing is preferred for both steps. By slowly addition it is meant herein that the addition is done gradually, e.g. drop wise or other similar means, to cause a uniform solidification reaction as known in the art.

A solution (1) containing the magnesium compound of formula $Mg(OR^7)_{2-n}(R^6)_n$ (II), wherein $R^6$ and $R^7$ are defined as described above and $0 \leq n < 2$, is prepared first: by contacting, in a hydrocarbon solvent (e.g. heptane), a compound of formula $Mg(R^6)_2$, wherein $R^6$ is defined as described above, e.g. each $R^6$ is independently methyl, ethyl, propyl, butyl, pentyl, hexyl, heptyl or octyl, e.g. di(n-butyl) magnesium, n-butyl sec-butyl magnesium, butyl ethyl magnesium or butyl octyl magnesium, preferably butyl octyl magnesium (BOMAG),
with an alcohol of formula $R^7OH$, wherein $R^7$ is defined as described above. Preferably $R^7$ is a linear or branched $C_2$-$C_{16}$ alkyl group, most preferably a linear or branched $C_4$-$C_{12}$ alkyl group, particularly 2-ethyl-1-hexanol.

The alcohols which are usable to transform the magnesium alkyl compound to a magnesium compound soluble in a hydrocarbon solvent, are known in the art or can be readily determined by a skilled person. Said contact is effected in a temperature between 0 and 100° C., preferably at 10 to 40° C., e.g. at 20 to 30° C. The reaction can be completed by heating the system at 50 to 100° C. for 10 to 100 min. Preferably the alcohol is added to the Mg solution. The molar ratio of Mg dialkyl to $R^7OH$ (Mg:$R^7OH$) is preferably from 1:1 to 1:4, more preferably 1:1 to 1:3.5, e.g. 1:1.5 to 1:3.5, especially 1:1.8 to 1:3.1.

The solution (2) of the halogen-containing aluminium compound is prepared by dissolving in a hydrocarbon solvent as defined below (e.g. toluene) a compound of formula

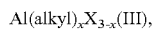

$Al(alkyl)_xX_{3-x}$ (III), wherein alkyl and X are defined as described above and x may or may not be an integer $0 \leq x < 3$; e.g. dimethyl aluminium chloride, diethyl aluminium chloride, diisobutyl aluminium chloride, ethyl aluminium dichloride and methyl aluminium dichloride, preferably ethyl aluminium dichloride (EADC). Such solutions may also be commercially available, whereby they may be further diluted, if desired, with a solvent as defined below.

To the prepared reaction mixture (1), i.e. Mg-compound-containing solution (1), is then added slowly the internal donor.

The so obtained solution is then added slowly to the Al solution (2).

It has been found that in order to achieve beneficial properties of the support material, the obtained solid reaction product should be recovered from the reaction mixture of solution (1) and (2) before the use as a support.

The recovery step can be effected in various ways including the separation of the solid reaction product from the liquid reaction medium, e.g. by filtration, decantation or suction, and washing the solid product with a wash solution e.g. in a manner known in the art, before it is used as a support material.

It is evident for a skilled person that the washing efficiency can be varied within the scope of the invention depending on the desired washing effect and can be controlled e.g. by the number of the washing steps, the temperature, the solvent(s) used for washing, the amount of the wash solution and the washing time. The wash temperature can be e.g. 0 to 100° C., suitably 20 to 100° C., e.g. 40 to 80° C., such as 55-70° C. Thus the duration of a washing (e.g. the mixing time of the slurry in a wash solution) depends on the desired effect and can be chosen accordingly. The washing effect depends on the separation efficiency of the solid material from the solution.

Ad Solutions of the Starting Compounds:

The term "solution" is understood herein broadly to include solutions prepared from (a) one or more of the support forming compounds in liquid form (liquid at the room temperature or a melt prepared at a higher temperature) and/or (b) from an organic solvent(s).

The solutions are suitably formed using an organic solvent that dissolves the compounds. Preferred solvents include inert hydrocarbons, e.g. linear or branched aliphatic, alicyclic or aromatic $C_{5-20}$ hydrocarbons, preferably $C_{6-12}$ hydrocarbons, wherein the ring systems may contain hydrocarbon, e.g. $C_{1-6}$ alkyl substituents, such as cyclohexane, hexane, heptane, octane or toluene, or any mixtures thereof. E.g. linear or branched alkanes, e.g. hexane, heptane or octane, may be used.

Ad Wash Solution:

As the wash solution, e.g. any organic solvent or mixtures thereof known in the art can be used. Preferable solvents include hydrocarbons as defined above, e.g. pentane, hexane or heptane, particularly heptane.

Further treatment steps of the solid reaction product may also be possible after the combination of solutions (1) and (2) (i.e. after the precipitation reaction) before or during the recovery step of the invention. Such treatment includes e.g. a heating step of the reaction mixture after the solidification at an elevated temperature, e.g. up to 100° C., such as 40 to 80° C., suitably 50 to 75° C., for a suitable period of time, such as from 5 minutes to 24 hours, e.g. 10 to 720 minutes, such as 20 to 360 minutes, before the recovery step.

The molar ratio of aluminium to magnesium in the support material is adjusted to a desired range by means of the recovery step of the invention, i.e. by separating the solids from the liquid reaction medium and by washing the solids as described above. Particularly, the obtained solid reaction product is washed with a wash solution, and the washing procedure can be repeated, if needed, until the desired ratio is obtained. The ratio can be monitored between the washings, if needed, e.g. by analysing the support samples in a conventional manner the relevant contents of the reaction product or the reaction medium, e.g. the mol-% of Mg and the mol-% of Al in the formed carrier material.

After the recovery step of the invention, the solid reaction product can be used as a support material for further catalytically active compounds, i.e. titanium to form a final polymerisation catalyst component, such as the solid ZN-procatalyst used according to the invention.

Accordingly, in the method for preparing the solid Ziegler-Natta procatalyst of the invention, the catalyst support, prepared as described above, is suspended in an organic solvent and treated with a titanium compound. The treatment step is preferably effected in a manner known in the art.

The titanium compound employed for the preparation of the procatalyst is also soluble in the liquid hydrocarbon and is, in general, a compound in which the titanium has its maximum valency, that is to say valency 4. The titanium compound employed may be a compound of the general formula $Ti(OR^8)_{4-y}X_y$, in which $R^8$ and X are defined as described above, and y an integral or fractional number ranging from 0 to 4. Among these compounds, titanium tetrachloride or titanium tetra-isopropoxide can be employed.

Preferably titanium tetrachloride is used.

Generally, in the final solid procatalyst particles, the molar ratio of Mg:Ti can be e.g. between 10:1 to 1:10, preferably less than 6:1, such as between less than 6:1 and 1:1.

The molar ratio of Ti:Al can be e.g. between 20:1 to 1:2, e.g. 5:1 to 1:1. The ratios can be determined in a manner known in the art.

The so prepared supported procatalyst is optionally washed in one to 4 washing steps and subsequently recovered.

Preferably the solid procatalysts have an average particles size in the range of 2 to 200 μm, more preferably from 5 to 150 μm and most preferably from 10 to 50 μm.

The final procatalyst, e.g. the ZN procatalyst, obtained according to any of the above described methods is combined with a cocatalyst.

Suitable cocatalysts are optionally halogenated aluminium alkyl cocatalysts of formula (V) $(C_1-C_4-alkyl)_p-Al-X_{3-p}$, wherein X is chlorine, bromine, iodine or fluorine and p is 1, 2 or 3.

The $C_1-C_4$-alkyl groups can be linear or branched or cyclic, or a mixture of such groups.

X is preferably chlorine or bromine, most preferably X is chlorine.

Suitable cocatalysts are for example trimethyl aluminium (TMA), triethyl aluminium (TEA) dimethyl aluminium chloride (DMAC), diethyl aluminium chloride (DEAC), diisobutyl aluminium chloride (DIBAC), ethyl aluminium dichloride (EADC), methyl aluminium dichloride (MADC).

A preferred cocatalyst according to the invention is triethylaluminium.

In the ZN polymerisation catalyst composition used according to the present invention, the molar ratio between the aluminium in said cocatalyst and the titanium of said procatalyst is preferably 1:1-100:1, more preferably 2:1-50:1 and most preferably 3:1-40:1.

The procatalyst and the cocatalyst may be contacted with each other prior to their introduction into the polymerisation reactor. However, it is equally well possible to introduce the two catalyst components separately into the reactor.

The procatalyst of the present invention may be used in a process for producing ethylene homo- or copolymer. In particular, the process for producing ethylene homo- or copolymer comprises the steps of
  (a) introducing the procatalyst as defined above into a polymerisation reactor,
  (b) introducing a cocatalyst capable of activating the said procatalyst into the polymerisation reactor,
  (c) introducing ethylene, optionally $C_3-C_{20}$ α-olefins and optionally hydrogen into the polymerisation reactor
  (d) maintaining said polymerisation reactor in such conditions as to produce an ethylene homo- or copolymer.

The Ziegler-Natta catalyst composition according to the present invention is thus especially suitable for a process for the production of an ethylene homopolymers or ethylene copolymers in which ethylene and $C_3-C_{20}$-alpha olefin monomers are copolymerised in the presence of the catalyst composition of the invention.

The ethylene copolymers are produced by copolymerising ethylene monomers with one or more alpha-olefin comonomers units.

The alpha-olefin comonomer units of polyethylene resins preferably are selected from $C_3-C_{20}$-alpha-olefins, more preferably are selected from $C_4-C_{10}$-alpha-olefins, such as 1-butene, isobutene, 1-pentene, 1-hexene, 4-methyl-1-pentene, 1-heptene, 1-octene, 1-nonene and 1-decene, as well as dienes, such as butadiene, 1,7-octadiene and 1,4-hexadiene, or cyclic olefins, such as norbornene, and any mixtures thereof.

Most preferably, the comonomer is 1-butene and/or 1-hexene.

If copolymers are the desired end product, the comonomer content of the ethylene copolymers can vary in wide ranges depending on the desired polymer properties.

Thus, the comonomer content can vary from 0.1 wt % up to 20 wt %, preferably 0.5 to 15 wt % and more preferably from 1.0 to 10 wt %

In addition, polymer with wide range of MFR can be produced, e.g. from $MFR_2$ from 1 to 300 g/10 min, preferably from 2 to 200 g/10 min and more preferably from 5 to 100 g/10 min, to $MFR_{21}$ from 0.1 to 15 g/10 min, preferably from 0.5 to 10 g/10 min and more preferably from 1 to 5 g/10 min. (190° C., 2.16 and 21 kg load, respectively).

Generally it is preferred that the produced polymers have lower MFR-values, since the lower the MFR-values, the higher the molecular weight.

The molecular weight for polyethylene copolymers produced by using the inventive procatalyst is at least 160 000 g/mol, preferably at least 180 000 g/mol and more preferably at least 190 000 g/mol.

Using the inventive supported procatalyst yields polyethylene copolymers with a molecular weight, which is at least 30%, preferably at least 45% and more preferably at least 60% higher than the molecular weight of a polyethylene copolymer produced with a procatalyst without the internal donor of the formula (I).

The catalyst system of the invention can be used for producing ethylene polymers, having a density of from about 900 to 965 kg/m3, preferably from 905 to 930 kg/m3.

Polymerisation processes, where the catalyst components of the invention are useful comprise at least one polymerisation stage, where polymerisation is typically carried out in solution, slurry or gas phase. Typically the polymerisation process comprises additional polymerisation stages or reactors. In one particular embodiment the process contains at least one slurry reactor zone and at least one gas phase reactor zone, each zone comprising at least one reactor and all reactors being arranged in cascade. In one particularly preferred embodiment the polymerisation process for polymerising ethylene optionally with comonomers, like propylene or other alpha-olefins, comprises at least one slurry reactor and at least one gas phase reactor arranged in that order.

The polymerisation in gas phase may be conducted in a fluidized bed reactor, in a fast fluidized bed reactor or in a settled bed reactor or in any combination of these. When a combination of reactors is used then the polymer is transferred from one polymerisation reactor to another. Furthermore, a part or whole of the polymer from a polymerisation stage may be returned into a prior polymerisation stage. Typically the gas phase polymerisation reactor is operated at a temperature within the range of from 50 to 100° C., preferably from 65 to 90° C. The pressure is suitably from 10 to 40 bar, preferably from 15 to 30 bar.

The polymerisation may be conducted also in slurry reactor. Then the polymer particles formed in the polymerisation, together with the catalyst fragmented and dispersed within the particles, are suspended in the fluid hydrocarbon. The slurry is agitated to enable the transfer of reactants from the fluid into the particles.

The polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the slurry polymerisation is typically from 50 to 115° C., preferably from 60 to 110° C. and in particular from 70 to 100° C. The pressure is from 1 to 150 bar, preferably from 10 to 100 bar.

The slurry polymerisation may be conducted in any known reactor used for slurry polymerisation. Such reactors include a continuous stirred tank reactor and a loop reactor. It is especially preferred to conduct the polymerisation in loop reactor.

It is sometimes advantageous to conduct the slurry polymerisation above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The process may further comprise pre- and post reactors.

Pre-reactors comprise typically prepolymerisation reactors. The purpose of the prepolymerisation is to polymerise a small amount of polymer onto the catalyst at a low temperature and/or a low monomer concentration. By prepolymerisation it is possible to improve the performance of the catalyst in slurry and/or modify the properties of the final polymer. The prepolymerisation step may be conducted in slurry or in gas phase. Preferably prepolymerisation is conducted in slurry.

Thus, the prepolymerisation step may be conducted in a loop reactor. The prepolymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerisation step is typically from 0 to 90° C., preferably from 20 to 70° C. and more preferably from 30 to 60° C.

The polymerisation may be carried out continuously or batch wise, preferably the polymerisation is carried out continuously.

The polyethylene copolymer can further show unimodal, bimodal or multimodal molecular weight distribution.

Unimodal polymers can be produced in a one stage polymerisation, although more than one stage is possible, but then polymers with approximately the same molecular weight are produced in each stage. Any type of polymerisations as listed above is possible.

Bimodal or multimodal polyethylene copolymers can be produced in dual or multi-stage and -reactor processes which are known in the art.

Different combinations for producing multimodal polymers can be used, e.g. gas-gas phase, slurry-slurry phase, slurry-gas phase processes; slurry-gas phase polymerisation being a preferred one.

Multimodal polymers with respect to the molecular weight distribution (MWD) are produced in a multistage process, where lower molecular weight and higher molecular weight polymers (components) are produced in different polymerisation steps, in any order.

If the lower molecular weight component is produced in the first stage and the higher molecular weight component thus being produced in the second step, this is called normal mode.

On the contrary, if the lower molecular weight component is produced in the second stage and the higher molecular weight component thus being produced in the first step, this is called reverse mode.

Preferably the process according to the invention is run in the normal mode.

More preferably the production of the lower molecular weight and higher molecular weight components is carried out as a combination of slurry polymerisation for the lower molecular weight component and gas phase polymerisation for the higher molecular component.

Thus the first stage is carried out in the slurry phase and produces preferably the lower molecular weight component. The second stage can be carried out in a gas phase or in a slurry phase, but is preferably carried out in the gas phase. Preferably the second stage produces the higher molecular weight component. In a preferred polymerisation process one slurry phase stage is followed by one gas phase stage.

A preferred multistage process for producing ethylene (co)polymers is a "loop-gas phase"-process, such as developed by Borealis (known as BORSTAR® technology) described e.g. in patent literature, such as in WO-A-92/12182 and WO-A-96/18662.

EXPERIMENTAL PART

1.) Methods:
Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer and the molecular weight. The MFR is determined at 190° C. for polyethylene. It may be determined at different loadings such as 2.16 kg (MFR2), 5 kg (MFR5) or 21.6 kg (MFR21).

GPC: Molecular Weight Averages, Molecular Weight Distribution, and Polydispersity Index (Mn, Mw, MWD, PDI)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2×GMHXL-HT and 1× G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling in into the GPC instrument.

Density was measured according to ISO 1183-187. Sample preparation was done by compression moulding in accordance with ISO 1872-2:2007.

Comonomer Content from PE (FTIR)

Comonomer content was determined in a known manner based on Fourier transform infrared spectroscopy (FTIR) determination using Nicolet Magna 550 IR spectrometer together with Nicolet Omnic FTIR software.

Films having a thickness of about 220 to 250 µm were compression moulded from the samples. Similar films were made from calibration samples having a known content of the comonomer. The thicknesses were measured from at least five points of the film. The films were then rubbed with sandpaper to eliminate reflections. The films were not touched by plain hand to avoid contamination. For each sample and calibration sample at least two films were prepared. The films were pressed from pellets by using a Graceby Specac film press at 150° C. using 3+2 minutes preheating time, 1 minute compression time and 4 to 5 minutes cooling time. For very high molecular weight samples the preheating time may be prolonged or the temperature increased.

The comonomer content was determined from the absorbance at the wave number of approximately 1378 cm$^{-1}$. The comonomer used in the calibration samples was the same as the comonomer present in the samples. The analysis was performed by using the resolution of 2 cm$^{-1}$, wave number span of from 4000 to 400 cm$^{-1}$ and the number of sweeps of 128. At least two spectra were run from each film.

The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

From the calibration samples a straight line is obtained as follows:

$$C_i = k \cdot \frac{A_{1378,i}}{s_i} + b$$

where $C_i$ is the comonomer content of the calibration sample i $A_{1378,i}$ is the absorbance at appr. 1378 cm$^{-1}$ of sample i $s_i$ is the thickness of the film made of calibration sample i k is the slope of the calibration line (obtained by regression analysis), and b is the intercept of the calibration line (obtained by regression analysis).

By using the thus obtained parameters k and b the comonomer content of the samples were obtained from $$C_x = k \cdot \frac{A_{1378,x}}{s_x} + b$$

where $C_x$ is the comonomer content of the unknown sample $A_{1378,x}$ is the absorbance at appr. 1378 cm$^{-1}$ of the unknown sample $s_x$ is the thickness of the film made of the unknown sample k is the slope of the calibration line obtained from the calibration samples as above b is the intercept of the calibration line obtained from the calibration samples.

The method gives the comonomer content in weight-% or in mol-%, depending on which was used in the calibration. If properly calibrated, the same approach may also be used to determine the number of methyl groups, i.e., CH$_3$ per 1000 carbon atoms.

ICP Analysis (Al, Mg, Ti)

The elemental analysis of a catalyst was performed by taking a solid sample of mass, M, cooling over dry ice. Samples were diluted up to a known volume, V, by dissolving in nitric acid (HNO$_3$, 65%, 5% of V) and freshly deionised (DI) water (5% of V). The solution was further diluted with DI water up to the final volume, V, and left to stabilize for two hours.

The analysis was run at room temperature using a Thermo Elemental iCAP 6300 Inductively Coupled Plasma—Optical Emission Spectrometer (ICP-OES) which was calibrated using a blank (a solution of 5% HNO$_3$), and standards of 0.5 ppm, 1 ppm, 10 ppm, 50 ppm, 100 ppm and 300 ppm of Al, Mg and Ti in solutions of 5% HNO$_3$.

Immediately before analysis the calibration is 'resloped' using the blank and 100 ppm standard, a quality control sample (20 ppm Al, Mg and Ti in a solution of 5% HNO$_3$, 3% HF in DI water) is run to confirm the reslope. The QC sample is also run after every 5$^{th}$ sample and at the end of a scheduled analysis set.

The content of Mg was monitored using the 285.213 nm line and the content for Ti using 336.121 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

Donor and 2-EHA Analysis for Phthalate-free Catalyst Via GC

The donor analysis of a catalyst was performed by taking a solid sample of mass, M, approximately 2 ml of solvent, dichloromethane, was added. Following this approximately 1 ml of deionised water was added to the vial. Finally, a known mass, N, of an internal standard, nonane, was added. The mixture was then sonicated for 15 min, to ensure full dissolution.

After sonication the sample is left to settle into two phases and an aliquot of the organic phase is removed, this is then filtered through a 0.45 μm nylon filter into a vial suitable for the gas chromatography instrument.

The analysis is performed on a Perkin Elmer Auto System XL Gas Chromatograph containing a split loop injector and flame ionization detector. The column is a DB-1, 30 m long with an inner diameter of 0.32 mm and a phase thickness of 0.25 μm. The system stays at 40° C. for 5 minutes before ramping at 10° C./min up to 250° C., the system is kept at temperature for a further 4 minutes. If required the peak temperature could be raised to 300° C.

The results are calculated in the following manner.

$$\text{Component (wt \%)} = \frac{Ax * F * N}{Ay * Fistd * M} * 100$$

where:

Ax=component area

F=component factor

N=mass of internal standard (nonane), mg

Ay=area of internal standard (nonane)

Fistd=factor of internal standard (nonane)

M=mass of the sample, mg

EXAMPLE 1

Catalyst Preparation a) Preparation of the Mg-alcoholate Compound 35.7 mL of 2-ethylhexanol (from Sigma-Aldrich) was placed in a 300 mL glass reactor equipped with a mechanical stirrer. To this alcohol 137.0 mL of BOMAG (Mg(Bu)1,5 (Oct)$_{0.5}$, a 20% solution in heptane), from Chemtura, was added within 77 minutes with stirring (molar ratio of alcohol/Mg=1.9). During the addition reactor contents were maintained below 25° C. After the addition of BOMAG, mixing of the reaction mixture at 25° C. was continued for another 60 minutes. The temperature of the reaction mixture was then raised to 60° C. within 17 minutes and held at that temperature for 60 minutes with stirring, at which time the reaction was complete. The reaction mixture was cooled to room temperature to obtain 122 g of the Mg-alkoxide compound as a colourless liquid.

b) Preparation of the Catalyst

Supported Material 5.9 mL of EADC (25% solution in toluene) was placed in a glass reactor equipped with a mechanical stirrer at 25° C. Mixing speed was set to 170 rpm. 20 mL of solution of magnesium alkoxide compound prepared as described above, and 0.26 mL of the donor 2.2-di(2-tetrahydrofuryl) propane, CAS no 89686-69-1, provided by TCI were pre-mixed for ten minutes at room temperature, and this mixture was slowly added to EADC keeping the reaction temperature around 24° C. The temperature of the reaction mixture was raised to 60° C. within 18 minutes and the temperature was maintained at 60° C. for another 30 minutes. Stirring was stopped, the reaction mixture was allowed to settle at 60° C. for 15 minutes and the liquid was siphonated off. Resulting support was cooled to room temperature and washed as follows, Wash 1

20 mL of heptane was added, stirred for 10 minutes, the support was allowed to settle for 10 minutes and the upper liquid layer was siphonated.

Wash 2

20 mL of heptane was added, stirred for 10 minutes, the support was allowed to settle for 19.5 hours and the upper liquid layer was siphonated to yield 22.1 g of the support material.

This support material was used in the following titanation step.

Titanation of the Support Material 22.1 g of the support material synthesized above was placed in a glass reactor equipped with a mechanical stirrer at 25° C. Mixing speed was set to 170 rpm and 0.76 mL of TiCl$_4$ was added to the support material. The temperature of the reaction mixture was raised to 60° C. within 18 minutes and the temperature was maintained at 60° C. for another 30 minutes. Stirring was stopped, the reaction mixture was allowed to settle at 60° C. for 35 minutes and the liquid was siphonated off. Resulting solid was cooled to room temperature and was washed as follows:

Wash 1

20 mL of heptane was added, stirred for 15 minutes, the solid material was allowed to settle for 30 minutes and the upper liquid layer was siphonated.

Wash 2

20 mL of pentane was added, stirred for 15 minutes, the sold material was allowed to settle for 30 minutes and the upper liquid layer was siphonated.

Finally the temperature was increased to 60° C. and the solid catalyst was dried at this temperature for 1.5 hours under a flow of nitrogen to yield 1.3 g of the catalyst as an air sensitive solid.

COMPARATIVE EXAMPLE CE1

Support Material 6.2 mL of EADC (25% solution in toluene) was placed in a glass reactor equipped with a mechanical stirrer at 25° C. Mixing speed was set to 170 rpm. 20 mL of magnesium alkoxide solution prepared as described above was slowly added to EADC within 10 minutes keeping the reaction temperature around 22° C. The temperature of the reaction mixture was raised to 60° C. within 18 minutes and the temperature was maintained at 60° C. for another 30 minutes. Stirring was stopped, the reaction mixture was allowed to settle at 60° C. for 15 minutes and the liquid was siphonated off. Resulting support was cooled to room temperature and was washed as follows:

Wash 1

20 mL of heptane was added, stirred for 10 minutes, the support was allowed to settle for 35 minutes and the upper liquid layer was siphonated.

Wash 2

20 mL of heptane was added, stirred for 10 minutes, the support was allowed to settle for 71 hours and the upper liquid layer was siphonated to yield 22.5 g of the support material.

This support material was used in the following titanation step.

Titanation of the Support Material 22.5 g of the support material synthesized above was placed in a glass reactor equipped with a mechanical stirrer at 25° C. Mixing speed was set to 170 rpm and 0.81 mL of TiCl$_4$ was added to the support material. The temperature of the reaction mixture was raised to 60° C. within 17 minutes and the temperature was maintained at 60° C. for another 30 minutes. Stirring was stopped, the reaction mixture was allowed to settle at 60° C. for 35 minutes and the liquid was siphonated off. Resulting solid was cooled to room temperature and washed as follows:

Wash 1

20 mL of heptane was added, stirred for 10 minutes, the solid material was allowed to settle for 30 minutes and the upper liquid layer was siphonated.

Wash 2

20 mL of pentane was added, stirred for 10 minutes, the sold material was allowed to settle for 30 minutes and the upper liquid layer was siphonated.

Finally the temperature was increased to 60° C. and the solid catalyst was dried at this temperature for 1.5 hours under a flow of nitrogen to yield 4.97 g of the catalyst as an air sensitive solid.

COMPARATIVE EXAMPLE CE2

Support Material 5.9 mL of EADC (25% solution in toluene) was placed in a glass reactor equipped with a mechanical stirrer at 25° C. Mixing speed was set to 170 rpm. 20 mL of magnesium alkoxide solution prepared as described above, and 0.23 mL of THF were pre-mixed for ten minutes at room temperature, and this mixture was slowly added to EADC within 14 minutes keeping the reaction temperature around 24° C. The temperature of the reaction mixture was raised to 60° C. within 18 minutes and the temperature was maintained at 60° C. for another 30 minutes. Stirring was stopped, the reaction mixture was allowed to settle at 60° C. for 15 minutes and the liquid was siphonated off. Resulting support was cooled to room temperature and was washed as follows:
Wash 1
20 mL of heptane was added, stirred for 10 minutes, the support was allowed to settle for 10 minutes and the upper liquid layer was siphonated.
Wash 2
20 mL of heptane was added, stirred for 10 minutes, the support was allowed to settle for 20 hours and the upper liquid layer was siphonated to yield 22 g of the support material.

This support material was used in the following titanation step.

Titanation of the Support Material
22 g of the support material synthesized above was placed in a glass reactor equipped with a mechanical stirrer at 25° C. Mixing speed was set to 170 rpm and 0.76 mL of TiCl$_4$ was added to the support material. The temperature of the reaction mixture was raised to 60° C. within 18 minutes and the temperature was maintained at 60° C. for another 30 minutes. Stirring was stopped, the reaction mixture was allowed to settle at 60° C. for 35 minutes and the liquid was siphonated off. Resulting solid was cooled to room temperature and washed as follows:
Wash 1
20 mL of heptane was added, stirred for 15 minutes, the solid material was allowed to settle for 30 minutes and the upper liquid layer was siphonated.
Wash 2
20 mL of pentane was added, stirred for 15 minutes, the sold material was allowed to settle for 30 minutes and the upper liquid layer was siphonated.

Finally the temperature was increased to 60° C. and the solid catalyst was dried at this temperature for 2 hours under a flow of nitrogen to yield 1.94 g of the catalyst as an air sensitive solid.

TABLE 1

| Catalyst | Ti (Wt %) | Mg (Wt %) | Al (Wt %) | 2-EHA (Wt %) |
| --- | --- | --- | --- | --- |
| CE 1 | 5.14 | 5.35 | 0.77 | 12 |
| CE 2 | 4.60 | 7.32 | 0.89 | 7.3 |
| Ex 1 | 4.14 | 14.1 | 1.64 | 6.3 |

EXAMPLE 2

Ethene-butene Co-polymerisation
All polymerisations were conducted in a 3 L stainless steel semi-batch reactor. 1.25 L of propane and alkyl aluminum co-catalyst (TEA) were used in all polymerisation experiments. The polymerisation procedure was conducted as follows: 1.25 L of propane and the desired amount of hydrogen were added and the contents of the reactor were stirred and heated to the run temperature (85° C.). The cocatalyst and the catalyst were then introduced along with the desired amount of 1-butene comonomer and ethylene. Ethylene was fed on demand to maintain the specified pressure for the specific length of the polymerisation run (60 minutes). The reactor was maintained and controlled at the desired run temperature (85° C.) throughout the polymerisation. Upon completion, the ethylene flow was stopped and the reactor pressure slowly vented off. The reactor was opened and the polymer product was collected and dried in a fume hood overnight.

TABLE 2

| | Copolymerisation results | | | | | |
| --- | --- | --- | --- | --- | --- | --- |
| Catalyst | Catalyst amount (mg) | Yield (g) | Activity (kgPE/ gCat · h) | 1-butene (wt %) | MFR$_{21}$ (g/10 min) | Mw | Density (kg/m$^3$) |
| CE 1 | 11.3 | 212 | 19 | 7.7 | 28 | 121,000 | 0.9169 |
| CE 2 | 10.5 | 163 | 16 | 6.6 | 12 | 137,000 | 0.9175 |
| Ex 1 | 17.6 | 144 | 8 | 5 | 3 | 200,000 | 0.9172 |

TEA was used as the cocatalyst with Al/Ti (mol/mol)=20, with H$_2$/C$_2$ (mol/kmol)=50, 1-butene/C$_2$ (mol/kmol)=750 and 5 mol % ethylene concentration in the reactor.

From Table 2, it can be clearly seen that with the inventive catalyst higher Mw i.e. lower MFR is obtained, in comparison to the comparative examples 1 & 2 under similar polymerisation conditions.

The invention claimed is:
1. Supported Ziegler-Natta procatalyst for ethylene polymerisation, comprising:
(i) a procatalyst that includes
   a) a Group 1 to 3 metal of the periodic table, in the range of 6.5 to 18 wt. %,
   b) a Group 13 or 14 metal of the periodic table, in the range of 0.3 to 3.5 wt. %,
   c) an internal donor selected from bi-(oxygen containing ring) compounds of formula (I):

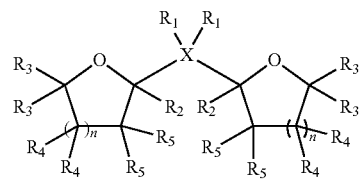

X is C or Si,
each R$_1$ is the same or different and is hydrogen, a linear or branched C$_1$ to C$_8$-alkyl group, or a C$_3$-alkylene group,
and each R$_2$ to R$_5$ are the same or different and are hydrogen,
a linear or branched C$_1$ to C$_8$-alkyl, or a C$_3$-C$_8$-alkylene group,
whereby two or more of R$_1$ to R$_5$ optionally form a ring,
n is the same for both oxygen-containing rings and is 1 or 2,
whereby the two oxygen-containing rings are individually saturated or unsaturated,
or an isomer mixture therefrom, and
   d) a Group 4 to 6 metal of the periodic table, in the range of 2.0 to 7.0 wt %; and
(ii) an inorganic support.
2. Supported Ziegler-Natta procatalyst according to claim 1, wherein in formula (I) X is C, both R$_1$ are the same and are a linear C$_1$-C$_4$-alkyl, each R$_2$ to R$_5$ are the same or different and are H or a C$_1$ to C$_2$ alkyl, n is for both oxygen-containing rings 1 and both oxygen-containing rings are saturated.
3. Supported Ziegler-Natta procatalyst according to claim 1 wherein in formula (I) X is C, both R$_1$ are the same and are methyl, up to four of the residues R$_2$ to R$_5$ are methyl and the remaining residues are H, n is for both oxygen-containing rings 1 and both oxygen-containing rings are saturated.

4. Supported Ziegler-Natta procatalyst according to claim 1, wherein the procatalyst is deposited on the inorganic support.

5. Supported Ziegler-Natta procatalyst according to claim 1, wherein the inorganic support is silica or magnesium chloride.

6. Supported Ziegler-Natta procatalyst according to claim 1, wherein the inorganic support is silica or magnesium chloride.

7. Process for preparing a supported procatalyst according to claim 1 comprising depositing on a particulate inorganic support:
   a) a metal compound of Group 1 to 3, comprising a magnesium compound of formula $Mg(OR^7)_{2-n}(R^6)n$ (II), wherein each $R^7$ and $R^6$ is independently a $C_{1-20}$ alkyl group which may optionally be substituted with halogen and $0 \leq n < 2$
   b) a metal compound of Group 13 or 14, comprising an Al compound having the formula $Al(alkyl)_xX_{3-x}$ (111), where alkyl is an alkyl group with 1 to 12 carbon atoms, X is halogen and $0 \leq x \leq 3$,
   c) an internal donor selected from bi-(oxygen containing ring) compounds of formula (I):

$$\begin{array}{c} R_1 \quad R_1 \\ R_3 \diagdown \quad X \quad \diagup \\ R_3 \diagup O \quad O \diagdown R_3 \\ R_3 \quad R_2 \quad R_2 \quad R_3 \\ R_4 \diagup (\ )_n \diagdown R_5 \quad R_5 \diagup (\ )_n \diagdown R_4 \\ R_4 \quad R_5 \quad R_5 \quad R_4 \end{array}$$

X is C or Si,
each $R_1$ is the same or different and is hydrogen, a linear or branched $C_1$ to $C_8$-alkyl group, or a $C_3$-$C_8$-alkylene group, and each $R_3$ to $R_5$ are the same or different and are hydrogen, a linear or branched $C_1$ to $C_8$-alkyl, or a $C_3$-$C_8$-alkylene group,
whereby two or more of $R_1$ to $R_5$ can form a ring,
n is the same for both oxygen-containing rings and can be 0, 1 or 2, whereby the two oxygen-containing rings can be individually saturated or unsaturated, and
   d) a transition metal compound of Group 4 to 6, comprising a halogen-containing titanium compound of the formula $X_yTi(OR^8)_{4-y}$ (IV), wherein $R_8$ is a $C_2$-$C_{20}$ alkyl group, X is halogen and y is 1, 2, 3 or 4.

8. Process according to claim 7, wherein the inorganic support is silica or magnesium chloride.

9. Process according to claim 7, wherein procatalyst is prepared by:
   contacting the inorganic support first with the Al compound having the formula $Al(alkyl)_xX_{3-x}$ (III), where alkyl is an alkyl group with 1 to 12 carbon atoms, X is halogen and $0 \leq x \leq 3$ to give a first reaction product;
   then the first reaction product is contacted with a magnesium compound of formula $Mg(OR^7)_{2-n}(R^6)n$ (II), wherein each $R^7$ and $R^6$ is independently a $C_{1-20}$ alkyl group which may optionally be substituted with halogen and $0 \leq n < 2$ to give a second reaction product;
   the second reaction product is contacted with the halogencontaining titanium compound of the formula $X_yTi(OR^8)_{4-y}$ (IV), wherein $R^8$ is a $C_2$ $C_{20}$ alkyl group, X is halogen and y is 1, 2, 3 or 4,
   whereby the magnesium compound of formula $Mg(OR^7)_{2-n}(R^6)_n$ (II) is first contacted with the internal donor of the formula (I) or an isomer mixtures therefrom before contacting with the first reaction product.

10. Process according to claim 7, wherein
procatalyst is prepared by:
   contacting the inorganic support with the Al compound having the formula $Al(alkyl)_xX_{3-x}$ (III), where alkyl is an alkyl group with 1 to 12 carbon atoms, X is halogen and $0 \leq x \leq 3$ and the magnesium compound of formula $Mg(OR^7)_{2-n}(R^6)n$ (II), wherein each $R^7$ and $R^6$ is independently a $C_{1-20}$ alkyl group which may optionally be substituted with halogen and $0 \leq n < 2$ in any order to form a first solid intermediate
   and either contacting the first solid intermediate with the internal donor of the formula (I) or an isomer mixture therefrom and subsequently with the halogen-containing titanium compound of the formula $X_yTi(OR^8)_{4-y}$ (IV), wherein $R^8$ is a $C_2$-$C_{20}$ alkyl group, X is halogen and y is 1, 2, 3 or 4,
   or contacting the first solid intermediate with the halogen-containing titanium compound of the formula $X_yTi(OR^8)_{4-y}$ (IV), wherein $R^8$ is a $C_2$-$C_{20}$ alkyl group, X is halogen and y is 1, 2, 3 or 4, and then with the internal donor of the formula (I) or an isomer mixture therefrom.

11. Process for preparing a supported procatalyst according to claim 1 comprising the steps of:
   1) preparing a solid magnesium aluminium complex containing magnesium, halogen, aluminium and an internal donor of the formula (I) or an isomer
   mixtures therefrom by
      (a1) adding to a solution of a magnesium compound of the formula (II):
         $Mg(OR^7)_{2-n}(R^6)_n$, wherein each $R^6$ and $R^7$ independently represents a $C_1$-$C_{20}$ alkyl group and $0 \leq n < 2$,
         an internal donor of formula (I) or an isomer mixture therefrom and
      (a2) contacting the solution of (a1) with a solution of a compound of formula (III):
         $Al(alkyl)_xX_{3-x}$, wherein each alkyl independently represents an alkyl of 1 to 6 carbon atoms; X is independently a halogen; $0 \leq x < 3$,
      (a3) separating the solidified reaction product from the reaction mixture and optionally washing the product with a wash solution once up to 4 times,
   2) subsequently treating said solid magnesium aluminium complex with a halogen-containing titanium compound of the formula $X_yTi(OR^8)_{4-y}$ (IV), wherein $R^8$ is a $C_2$-$C_{20}$ alkyl group, X is halogen and y is 1, 2, 3 or 4, and
   3) optionally performing one to 4 washing steps and recovering the supported procatalyst.

12. Process for preparing a supported procatalyst according to claim 1 comprising the steps of:
   1) preparing a solid magnesium aluminium complex containing magnesium, halogen, aluminium and an internal donor of the formula (I) or an isomer mixtures therefrom by
      (b1) adding to a solution of a magnesium compound of the formula (II):
         $Mg(OR^7)_{2-n}(R^6)n$, wherein each R6 and R7 independently represents a C1-C20 alkyl group and $0 \leq n < 2$,
      a solution of a compound of formula (III):
         $Al(alkyl)_xX_{3-x}$, wherein each alkyl independently represents an alkyl of 1 to 6 carbon atoms; X is independently a halogen; $0 \leq x < 3$, (b2) separating the solidified reaction product from the reaction mixture and optionally washing the product with a wash solution, whereby the internal donor is either first premixed with the solution of the compound of formula (III) or added after contacting the solution of a magnesium compound of the formula (II) with the solution of a compound of formula (III).

* * * * *